Sept. 20, 1932.  F. ACKERMAN  1,878,361
AUTOMOBILE LIFT
Filed Dec. 23, 1929   2 Sheets-Sheet 1
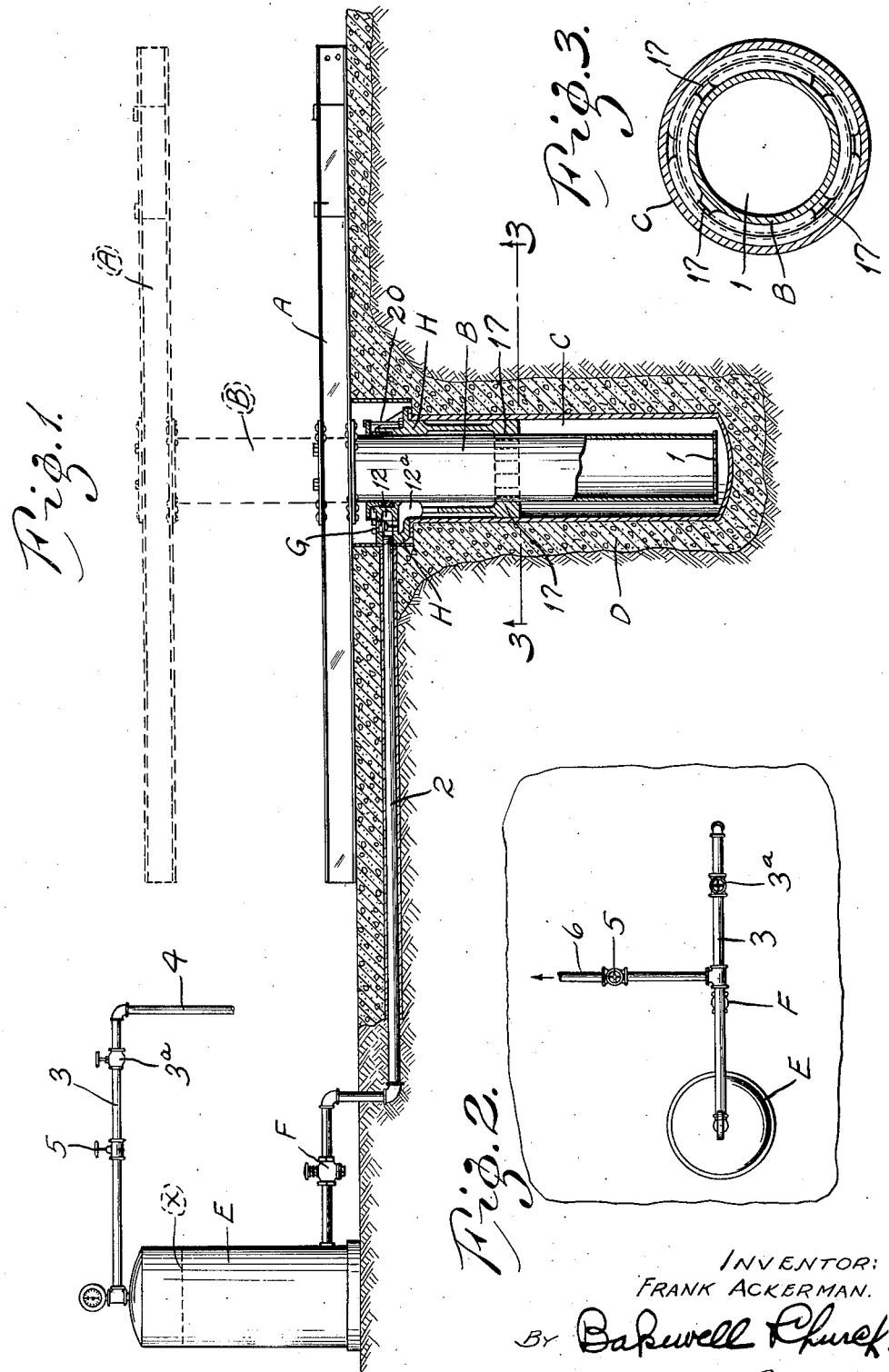
INVENTOR:
FRANK ACKERMAN.
By Bakewell Church
ATTORNEY Sept. 20, 1932. F. ACKERMAN 1,878,361
AUTOMOBILE LIFT
Filed Dec. 23, 1929 2 Sheets-Sheet 2
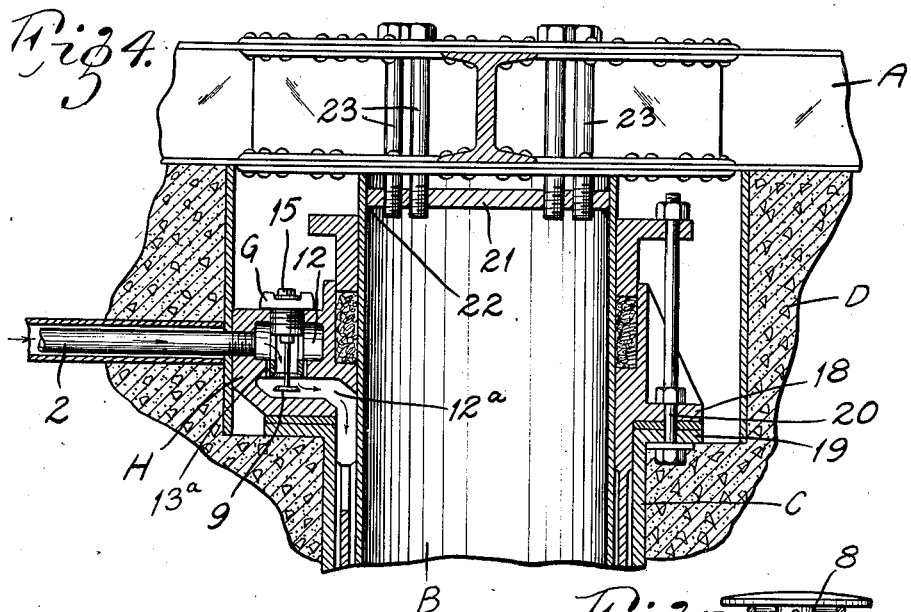
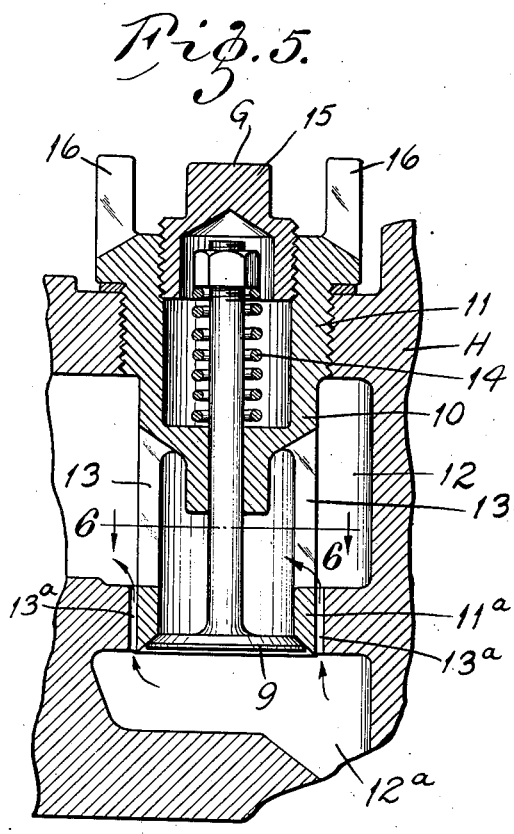
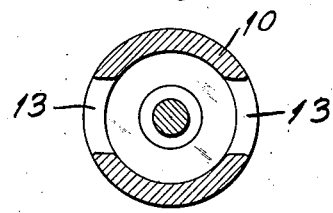
INVENTOR:
FRANK ACKERMAN
By Bakewell Church
ATTORNEYS Patented Sept. 20, 1932

1,878,361

UNITED STATES PATENT OFFICE

FRANK ACKERMAN, OF ST. LOUIS, MISSOURI, ASSIGNOR TO CURTIS MANUFACTURING COMPANY, OF WELLSTON, MISSOURI, A CORPORATION OF MISSOURI

AUTOMOBILE LIFT

Application filed December 23, 1929. Serial No. 416,018.

This invention relates to automobile lifts, such as are used for sustaining an automobile in an elevated position during the operation of greasing, inspecting or working on the chassis.

One object of my invention is to provide an automobile lift whose platform or chassis supporting structure may be raised either at a high speed or low speed, depending upon the will of the operator in charge of the lift, but can be lowered or moved downwardly only at a slow speed, even though the exhaust valve for the operating medium be set in its wide open position, and even though the outlet pipe through which the operating medium escapes from the cylinder of the lift should rupture.

Another object is to provide an automobile lift that is equipped with a novel speed regulating device that does not retard, modify or interfere with the admission of the operating medium to the cylinder of the lift when the platform is being raised, but which insures the operating medium escaping from the cylinder at such a rate as to eliminate the possibility of the platform dropping suddenly or moving downwardly at a high speed, due to carelessness or inattention on the part of the operator when the platform is being lowered, or due to breakage of the pipe through which the operating medium is discharged from the cylinder.

Another object is to provide an automobile lift whose platform is detachably connected in a novel manner to the piston used to raise and lower the platform.

And still another object is to provide an automobile lift, which, in addition to having a governing means under control of the operator in charge of the lift, for admitting and exhausting the operating medium to and from the cylinder of the lift, is also equipped with a safety valve that is normally closed or in a condition to cut off the escape of the operating medium from the cylinder, and which has to be opened by the operator and maintained in its open position in order to cause the platform to descend.

Figure 1 of the drawings is a side elevational view, partly in vertical section, of an automobile lift constructed in accordance with my invention.

Figure 2 is a fragmentary top plan view, illustrating the oil tank, the inlet valve, the exhaust valve and the manually-operated check valve.

Figure 3 is a horizontal sectional view, taken on the line 3—3 of Figure 1.

Figure 4 is an enlarged vertical sectional view, illustrating the head of the cylinder, the speed regulating device mounted in said head, and the means used for connecting the platform to the piston.

Figure 5 is an enlarged vertical sectional view of the speed regulating device.

Figure 6 is a horizontal sectional view, taken on the line 6—6 of Figure 5; and

Figure 7 is a vertical sectional view of the manually-operated check valve that has to be opened before the platform will start to move downwardly.

Referring to the drawings which illustrate the preferred form of my invention, A designates a horizontally disposed platform or chassis supporting structure of any preferred type or design that is connected to the upper end of a piston B which is reciprocatingly mounted in a vertically-disposed cylinder C imbedded in a foundation D on which the platform A rests when it is in its lowered position, as shown in full lines in Figure 1, the piston B having a bottom end wall 1 on which an operating medium in the cylinder C exerts pressure so as to move the piston and platform upwardly and sustain them in an elevated position. In the apparatus herein illustrated the cylinder C is connected by means of a pipe 2 with a tank E which holds oil or some other suitable non-compressible liquid, the cylinder C and the pipe 2 being filled with oil and the tank E being filled with oil up to the level indicated by the dotted line $x$ in Figure 1. Compressed air or some other expansible medium under pressure is admitted to the upper end of the tank E above the surface of the oil in said tank, when it is desired to raise the platform and sustain it in an elevated position, thereby causing the oil in the cylinder C to exert upward pressure on the lower end of the piston B. When it is desired to lower the platform the compressed air or other operating medium that was admitted to the upper end of the tank E, is permitted to escape from said tank, thereby relieving the upward pressure on the piston and permitting the piston and platform to move downwardly, due to gravity.

In the form of my invention herein illustrated, the admission of the operating medium to the upper end of the tank E is controlled by a manually-operated inlet valve 3ª arranged in a pipe 3 that connects the upper end of the tank E with a pressure supply pipe 4, and the exhaust or escape of the operating medium from the upper end of the tank E is controlled by a manually-operated exhaust valve 5 arranged in an exhaust pipe 6 that branches laterally from the pipe 3, as shown in Figure 2. In order to eliminate the possibility of a careless or thoughtless operator manipulating the governing means so as to cause the platform to descend at a time when it should be maintained in its elevated position, for example, when a workman is located under the platform, I have equipped the apparatus with a normally closed safety valve F that has to be moved into its open position before the platform will start to move downwardly, and maintained in its open position during the downward movement of the platform. The valve F is arranged in the pipe 2 at any preferred point between the tank E and the upper end of the cylinder C and is provided with a spring-seated check valve element 7 that is free to open in a direction to permit the oil to flow from the tank E into the upper end of the cylinder C, but which prevents said oil from flowing in the reverse direction through the pipe 2, unless an actuating device 8 has been operated to move and maintain said valve element 7 in its open position. The actuating device 8 is herein illustrated as consisting of a foot operated plunger arranged vertically in the casing of the valve F above the valve element 7 and adapted to be moved downwardly by the operator in charge of the lift, so as to force the valve element 7 away from its seat, and thus open the passageway in the valve F through which the oil flows. As soon as the operator removes his foot from the plunger 8, a spring 8ª that is combined with said plunger, restores the plunger to its normal elevated position, and a spring 7ª that is combined with the valve element 7 automatically moves said valve element into its closed position shown in Figure 7, and retains said valve element in its closed position.

From the foregoing it will be seen that even though the operator opens the exhaust valve 5, the piston that carries the platform A will not move downwardly unless the operator has previously actuated the plunger 8 so as to open the valve element of the safety valve F and permit the oil to flow through the pipe 2 from the cylinder C towards the tank E. Moreover, it is necessary that the operator hold the plunger 8 depressed during the downward movement of the platform, for as soon as the valve element 7 seats or moves into its closed position, the flow of the oil through the pipe 2 towards the tank E is cut off. By constructing the apparatus in this manner I reduce to a minimum the liability of accidents resulting from carelessness or inattention on the part of the operator in manipulating the controlling valve, so as to lower the platform, for if the operator has to move two valves and manually hold one of said valves in its open position, to wit, the valve F, there is less danger of his manipulating the controlling valve improperly than there would be if a single valve governed the downward movement of the platform.

The apparatus is equipped with a speed regulating device G whose function is to prevent the platform A from dropping suddenly or moving downwardly at a dangerously high speed, even though the operator does not use good judgment in controlling the rate of discharge of the operating medium from the tank E, or in case of breakage of the piping that contains the operating medium. Said speed regulating device G is herein illustrated as being mounted in the head of the cylinder C preferably at the point where the oil pipe 2 is connected to said head, and it is constructed in such a way that it has no affect on the admission of the oil from the pipe 2 into the cylinder C, but does have an affect on the discharge of the oil from the cylinder C into the pipe 2 and prevents the oil from rushing out of said cylinder at such a rate as to cause the piston to drop suddenly or move downwardly at a high speed, even though the exhaust valve 5 and check valve F are maintained in their wide open position. As shown in Figures 4 and 5, the speed regulating device G comprises a spring-actuated check valve 9 and a cage 10 for said check valve. The cage 10 is removably mounted in the head H of the cylinder C at such a point that it can be easily removed from said head for inspection, cleaning or repair. At the upper end of said cage 10 is a threaded portion 11 that is screwed into a horizontally-disposed part of the cylinder head H which forms the top wall of a chamber 12 in said head to which the oil pipe 2 is connected. At the lower end of said valve cage 10 is an annular valve seat portion 11ª which is surrounded by a horizontally-disposed part of the cylinder head H which acts as a partition that separates the chamber 12 from a chamber 12ª located below the check valve 9. The cage 10 can either be of skeleton construction, or it can be provided with holes 13 through which the oil flows in traveling into and out of the cylinder C. In the operation of raising the platform A the oil flows through the pipe 2 in the direction indicated by the arrows in Figure 4, thereby exerting pressure on the check valve 9 in a direction to open said valve and permit the oil to pass from the chamber 12 in the cylinder head H into the chamber 12ª. In the operation of lowering the platform the check valve 9 remains seated, and the oil escapes from the cylinder C into the pipe 2 through a by-pass 13ª around the check valve 9. This by-pass 13ª can be constructed in various ways without departing from the spirit of my invention, but is herein illustrated as being formed by an annular space that separates the exterior of of the annular valve seat portion 11ª of the cage 10 from the horizontally-disposed partition in the cylinder head that separates the chamber 12 from the chamber 12ª. By properly proportioning the area of the by-pass 13 the rate of downward travel of the platform A can be accurately controlled. The stem of the check valve 9 is surrounded by a spring 14 that is seated in a pocket in the valve cage 10, and said pocket is provided with a removable closure 15, so as to protect the valve actuating spring from dirt, but permit the valve to be easily disassembled when cleaning, grinding or repair of same is necessary. At the upper end of the cage 10 are lugs 16 which are adapted to be engaged by a spanner wrench or other tool, used to screw the valve cage 10 into and out of the head H of the cylinder. A speed regulating device of the construction above described is of simple design, it is not liable to get out of order when in use, it is easily accessible at all times for inspection, cleaning or repair, it permits the platform to be raised at a high speed or a low speed, according to the desire of the operator in charge of the lift, and it eliminates the possibility of the platform A dropping suddenly or moving downwardly at a dangerously high speed, due, of course, to the fact that the by-pass 13ª insures the oil escaping from the cylinder C at such a rate as to produce a slow or gradual downward movement of the platform, even though the exhaust valve 5 and manually-operated check valve F are maintained in their wide open position, or even though the pipe 2 or any other part of the system that contains the operating medium breaks.

The end plate 1 of the piston B preferably projects laterally from the piston so as to form a stop at the lower end of the piston which co-operates with a guide 17 on the cylinder head H to limit the upward movement or outward movement of the piston. In order that the piston may be easily withdrawn from the cylinder, the head H is combined with the cylinder in such a way that it can be completely disconnected from the cylinder. In the form of my invention herein illustrated the head H of the cylinder is provided with a laterally-projecting, horizontally-disposed flange 18 that laps over a horizontally-disposed, laterally-projecting flange 19 at the upper end of the cylinder, said parts being connected together by bolts or other suitable fastening devices 20. After the fastening devices 20 have been removed, the head H can be withdrawn from the upper end of the cylinder C, thus permitting the removal of the piston from the cylinder. The piston guide 17, previously referred to, projects downwardly from the head H into the cylinder C, so as to form a relatively long bearing surface for the piston that holds the piston securely in parallel relation with the cylinder C, notwithstanding the fact that the platform A connected to the upper end of the piston is subjected to strains tending to tilt or cant the piston. In order to reduce the friction between the guide 17 and the piston B to a minimum, said guide 17 is preferably so constructed that the intermediate portion of the guide will be slightly spaced away from the piston and from the inner surface of the cylinder C, thereby causing the guide 17 to bear on the side wall of the cylinder C at two widely separated points and to bear on the exterior of the piston B at two widely separated points.

The platform A, which may be of any preferred construction, is connected to the piston B in a novel manner. As shown in Figure 4, the piston B is preferably formed from a piece of tubing and an end plate 21 is set in the upper end of said piece of tubing and secured to same by a welded joint 22 which extends completely around the peripheral edge of the plate 21. The platform A bears squarely upon the upper edge of the piece of tubing from which the piston B is formed and is connected to said piston by bolts or other threaded fastening devices 23 that pass vertically through the platform and which are screwed into the plate 21 that constitutes the top end wall of the piston.

Having thus described my invention, what I claim as new and desire to secure by Letters Patent is:

1. An automobile lift, comprising a platform or chassis supporting structure, a cylinder provided with a piston that is adapted to be actuated by an operating medium to raise and lower the platform, a governing means for the operating medium by which the operator in charge of the lift can regulate the speed of travel of the platform when it is being raised, and a means separate and distinct from and in addition to said governing means for causing the platform to descend at a slow speed, irrespective of the desire of the operator.

2. An automobile lift, comprising a platform or chassis supporting structure, a cylinder provided with a piston that is adapted to be actuated by an operating medium to raise and lower the platform, a governing means under control of the operator in charge of the lift for controlling the admission and exhaust of the operating medium to and from the cylinder, and a separate and distinct means, not under control of the operator, arranged so as to have no affect on the admission of the operating medium to the cylinder but to cause the operating medium to escape from the cylinder at a slow rate, irrespective of the condition of said governing means.

3. An automobile lift, comprising a platform or chassis supporting structure, a cylinder provided with a piston that is adapted to be actuated by an operating medium to raise and lower the platform, a governing means for the operating medium adapted to be manipulated by the operator to cause the platform to move upwardly at a fast or slow speed, and a speed regulating device separate and distinct from said governing means, for regulating the rate of discharge of the operating medium from the cylinder, constructed so as to cause the platform to descend slowly at a predetermined speed.

4. An automobile lift of the kind described in claim 3, in which the speed regulating device is arranged in an accessible position in the head of the cylinder.

5. An automobile lift of the kind described in claim 3, in which the speed regulating device is mounted in the head of the cylinder and comprises a spring-seated check valve, arranged so as to open automatically in a direction to permit the operating medium to pass freely to the cylinder, and to close or seat and thus cut off the escape of the operating medium through the port controlled by said valve, and a by-pass around said check valve for causing the operating medium to escape from the cylinder at a slow rate.

6. In an automobile lift, the combination of a horizontally-disposed platform or chassis supporting structure, a vertically-disposed cylinder, a piston in said cylinder arranged with its upper end butted against the underside of said platform, a horizontally-disposed plate set inside of the upper end of said piston and permanently connected to same, and fastening devices combined with said platform and screwed into said plate for drawing the platform against the upper end of the piston.

7. An automobile lift, comprising a platform or chassis supporting structure, a cylinder, a piston in said cylinder adapted for raising and lowering the platform, a line through which an operating medium is delivered to and discharged from said cylinder, a governing means for the operating medium adapted to be actuated by the operator in charge of the lift when it is desired to raise and lower the platform, a safety valve in said line independent of and not controlled by said governing means, said safety valve being normally closed and adapted to be opened by the operator before the operating medium will start to escape from the cylinder, and a speed regulating device that causes the operating medium to escape from the cylinder at a slow rate, irrespective of the condition or adjustment of said governing means.

FRANK ACKERMAN.